United States Patent
Dombeck

[15] 3,647,032
[45] Mar. 7, 1972

[54] SURGE BRAKE CONTROL
[72] Inventor: Edward K. Dombeck, South Bend, Ind.
[73] Assignee: The Bendix Corporation
[22] Filed: June 17, 1970
[21] Appl. No.: 47,069

[52] U.S. Cl. .......................................... 188/112, 188/170
[51] Int. Cl. ........................................................ B60t 7/20
[58] Field of Search ................. 188/112, 142, 170; 280/428, 280/432, 446

[56] References Cited

UNITED STATES PATENTS

| | | | |
|---|---|---|---|
| 2,625,243 | 1/1953 | Jones et al. | 188/112 |
| 2,704,585 | 3/1955 | Stromberg | 188/112 UX |
| 3,026,975 | 3/1962 | Yoder | 188/112 |
| 3,077,248 | 2/1963 | Wayt | 188/112 |
| 3,342,292 | 9/1967 | Wherry | 188/112 |

Primary Examiner—Duane A. Reger
Attorney—Ken C. Decker and Plante, Hartz, Smith and Thompson

[57] ABSTRACT

A surge brake control unit is disclosed for attachment between a towed vehicle having brake means and a towing unit. The brake control includes a pair of elongated, coaxial, relatively movable, telescoping members. One of the members is secured to the towed vehicle, and the other member is adapted to be secured to the towing unit. Cooperative abutment means are provided on each of the members, and a spring yieldably urges the abutment means on the one member into engagement with the abutment means on the other member. A brake-applying device is carried at one end of the one member, and is engaged with the end of the other member. Upon relative movement between the members, the brake applying device applies the towed vehicle's brakes.

6 Claims, 2 Drawing Figures

PATENTED MAR 7 1972
3,647,032
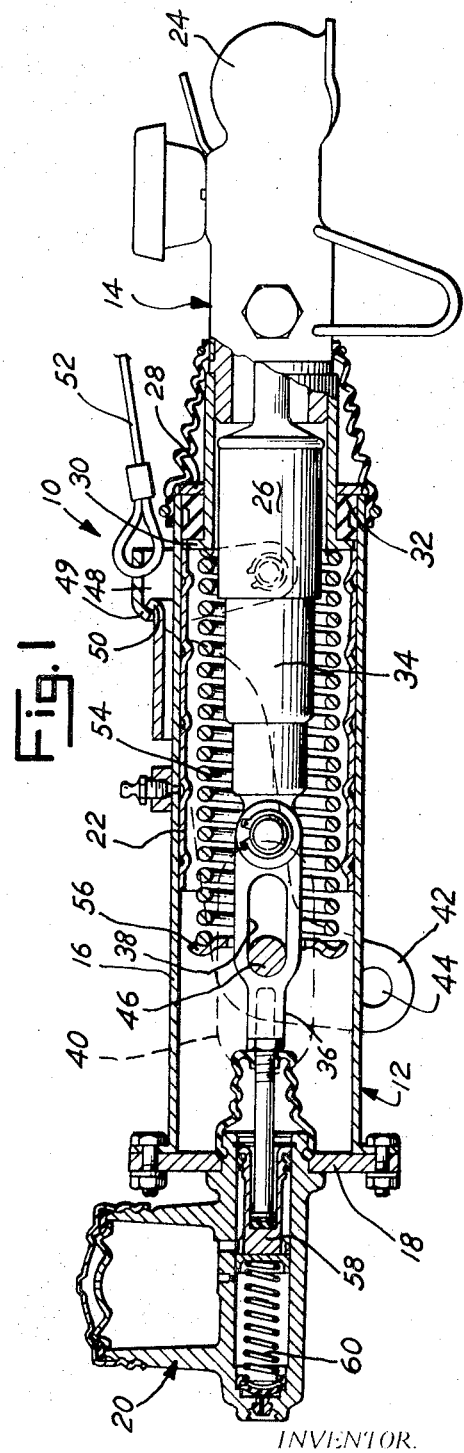
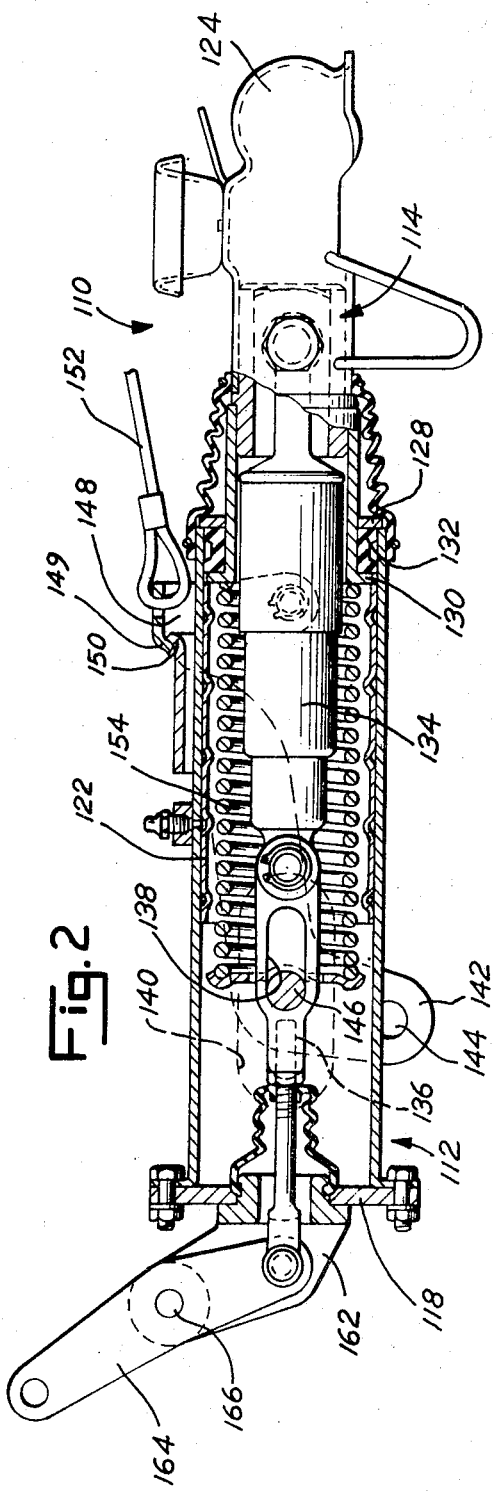
INVENTOR.
EDWARD K. DOMBECK
BY Ken C. Decker
ATTORNEY

SURGE BRAKE CONTROL

BACKGROUND OF THE INVENTION

This invention relates to a surge brake control unit for applying the brakes of a towed vehicle, such as a trailer, when the towing vehicle's brakes are applied.

For safety, many of the larger trailers that are commonly towed by an automobile are equipped with brakes. Most brakes used on trailers separate connections with the towing vehicle. For this reason, surge brakes, which operate independently of, but are synchronized with, the brakes of the towing vehicle have become increasingly popular, since no separate connection with the towing vehicle's braking system is required. However, existing surge brake controls are rather large and bulky devices that utilize very specialized and expensive fluid motors for applying the trailer's brakes. Another problem with existing hydraulic surge brake controls used on trailers commonly used in an adverse environment, such as boat trailers, is that the adverse environment coupled with long periods of nonuse sometimes causes the hydraulic brakes to deteriorate.

SUMMARY OF THE INVENTION

Therefore, an important object of my invention is to provide a surge brake control unit that is substantially smaller and of more simple construction than existing devices.

Another important object of my invention is to provide a surge brake control unit that uses a standard automotive master cylinder instead of a fluid motor of specialized design.

Another important object of my invention is to provide a surge brake control unit that may be used on either a hydraulic or a mechanical braking system.

A further object of my invention is to design a mechanism that will automatically apply the trailer's brakes should the trailer accidentally uncouple from the towing vehicle.

BRIEF DESCRIPTION OF THE DRAWINGS

FIG. 1 is a longitudinal cross sectional view of a surge brake control made pursuant to the teachings of my present invention.

FIG. 2 is a view similar to FIG. 1, but illustrating an alternate embodiment of my invention.

DETAILED DESCRIPTION

Referring now to FIG. 1 of the drawings, a surge brake control unit 10 includes a pair of elongated, coaxial, relatively movable members 12 and 14. The member 12 includes a tubular portion 16 and an end portion 18 which mounts a brake operating device such as a standard automotive master cylinder 20. The outlet ports of the master cylinder 20 are communicated to the wheel cylinders on the trailer's brakes for actuating the latter in the normal manner. The member 14 includes a tubular portion 22 which is slidably received by the tubular portion 16 of the member 12, a conventional trailer coupler 24 that fits over the towing vehicle's hitch ball (not shown), and a rodlike portion 26 that extends from the coupler 24 coaxially with the tubular portions 16 and 22. Cooperative abutment means 28 and 30 are provided on the tubular portions 16 and 22 with an annular resilient spacer 32 therebetween. The rodlike portion 26 includes a conventional extendible shock absorber 34 and another section 30 which connects the left end of the shock absorber 34 with the master cylinder 20. The section 36 in provided with an axially extending slot 38. The shock absorber dampens relative movement between the members 12 and 14, thereby preventing momentary actuation of the trailer's brakes when the trailer is towed over uneven terrain.

The tubular portion 16 of the member 12 is provided with slots 40 on opposite sides thereof (only one of which is shown). A bifurcated lever 42 (only one side of which is shown in the Figures) is pivotally mounted on the member 12 by a pin 44. Another pin 46 is rigidly secured to the lever 42 and extends through the slots 40 and 38 transversely of the members 12 and 14. A latching member 48 is pivotally mounted on the member 12 and is provided with a downwardly extending lip 49 that engages a corresponding upwardly extending lip 50 on the lever 42. A cable 52 interconnects the latching member 48 with the towing vehicle for reasons that will be explained hereinafter.

A coiled spring 54 is disposed concentrically with the rodlike portion 26. One end of the spring 54 engages the abutment 30 on the member 14, urging the latter to the right (viewing the figures) toward the abutment 28 on the member 12. The other end of the spring 54 engages a plate 56 that is also connected to the pin 46. The spring 54 thereby maintains the pin 46 in engagement with the leftwardmost end (viewing the Figures) of the slot 38, and also urges the abutment 28 into engagement with the spacer 32 and urges the latter tightly against the abutment 30.

MODE OF OPERATION

When the towing vehicle and the trailer are both traveling at substantially the same speed, the various components of the surge brake unit 10 will be disposed, as illustrated in FIG. 1. However, if the towing vehicle's brakes are applied, the trailer will continue to move at a substantially constant speed while the towing vehicle decelerates, thereby causing member 12 to move to the right, viewing FIG. 1, relative to the member 14. When this occurs, the pin 46, due to its connection with the member 12 through the lever 42, moves out of engagement with the end of the slot 38. At the same time, the master cylinder 20, which is secured to the member 12 moves to the right (viewing the figure) relative to the member 14. The rodlike member 26 therefore urges the master cylinder piston 58 toward the closed end of the bore, thereby developing pressure in the trailer's brake lines in a manner well known to those skilled in the art. When the trailer and towing vehicle are again traveling at substantially the same speed, the pin 46 is again urged into engagement with the end of the slot 38. The master cylinder 20 is therefore moved to the left (viewing FIG. 1) relative to the rodlike portion 26, thereby permitting the spring 60 in the bore of the master cylinder to return the piston 58 to the brake release position.

If the coupler 24 should accidentally become disconnected from the towing vehicle, the cable 52 will exert a force on the latching member 48 to disengage the lip 49 from the lip 50. The spring 54 will urge the pin 46 to the left, viewing the figures, thereby swinging the lever 42 in a counterclockwise arc about the pin 44 and also urging the section 36 of the rodlike portion 26 to the left relative to the member 14 and simultaneously extending the shock absorber 34. Movement of the section 36 moves the piston 58 to the left relative to the master cylinder housing, thereby developing pressure in the bore of the master cylinder to apply the trailer brakes in the normal manner. The surge brake control unit 10 therefore acts as a safety device to apply the trailer's brakes automatically whenever the trailer uncouples from the towing vehicle. When the trailer and towing vehicle are recoupled, the lever 42 is manually moved in a clockwise arc about the pin 44 and the lip 49 is again engaged with the lip 50. The trailer's brakes are thereby released.

DESCRIPTION OF THE ALTERNATE EMBODIMENT

In the alternate embodiment of FIG. 2, elements substantially the same as those in the preferred embodiment retain the same reference character, but appended by the numeral 1. Some trailers, especially those used to haul boats, are regularly subjected to an adverse environment and then to long periods of little or no use, which adversely affects the performance of the trailer hydraulic braking system. For this reason, it is desirable that mechanically actuated brakes be provided for this type of trailer.

The mechanical surge brake unit 110, illustrated in FIG. 2, is identical to the device illustrated in FIG. 1, except that the master cylinder 20 is replaced by a bracket 162 which is mounted on the end portion 118. A lever 164 is pivotally mounted on the bracket 162 by a pin 166. The rodlike portion 126 is pivotally connected to one end of the lever 164 and a linkage (not shown) connects the other end of the lever 164 with the trailer's brakes. Relative movement between the members 112 and 114 due to deceleration of the towing vehicle pivots the lever 164, which applies the vehicle's brakes in the normal manner.

The end portions 18 and 118 are preferably made to accommodate either the master cylinder 20 or the bracket 162. If this is done, the trailer's brake may be easily converted from a hydraulic to a mechanical system if the trailer's brakes are equipped with a conventional parking brake actuator. Upon a malfunction in the trailer hydraulic braking system, the master cylinder 20 is replaced by the bracket 162, and the parking actuator cables on the trailer are connected to the lever 164.

I claim:

1. In a brake control device for attachment between a towed vehicle having braking means and a towing unit:
   a pair of elongated, coaxial, relatively movable members;
   one of said members being adapted to be secured to said towed vehicle;
   the other of said members being adapted for connection to the towing unit;
   cooperative abutment means on each of said members;
   resilient means yieldably urging the abutment means on said other member toward the abutment means on the one member;
   brake-applying means carried on one end of said one member;
   said brake-applying means being connected to said other member at a point along the axis of the latter for operating said brake-applying means to apply said braking means upon relative movement between the members;
   said one member having a tubular portion;
   said other member having a tubular portion slidably engaged with the tubular portion of said one member and a rodlike portion extending through said tubular portion to said brake-applying means;
   the tubular portion of said other member slidably engaging the tubular portion of said one member;
   said cooperative abutment means being carried on the tubular portions of the respective members.

2. The invention of claim 1:
   said brake-applying means being a fluid motor.

3. The invention of claim 1:
   said brake-applying means being a lever mounted for pivoting movement with respect to said one member.

4. In a brake control device for attachment between a towed vehicle having braking means and a towing unit;
   a pair of elongated coaxial, relatively movable members;
   one of said members being adapted to be secured to said towed vehicle;
   the other of said members being adapted for connection to the towing unit;
   cooperative abutment means on each of said members;
   resilient means yieldably urging the abutment means on said other member toward the abutment means on the one member;
   brake-applying means carried on one end of said one member;
   said brake-applying means being connected to said other member at a point along the axis of the latter for operating said brake-applying means to apply said braking means upon relative movement between the members;
   said one member having a tubular portion;
   said other member having a tubular portion slidably engaged with the tubular portion of said one member and a rodlike portion extending through said tubular portion to said brake-applying means; and
   a pin carried by said one member extending through the latter at substantially right angles to the longitudinal axis of said one member;
   said rodlike portion having a longitudinally extending slot therein;
   said pin extending through said slot;
   said resilient means being operatively connected to said pin to yieldably urge the latter into engagement with one end of said slot.

5. The invention of claim 4; and
   releasable means carried by said housing;
   said pin being rigidly connected to said releasable means;
   said resilient means urging said pin away from said abutment means upon release of the releasable means whereby said resilient means drives a section of said other member toward said brake-applying means to operate the latter.

6. The invention of claim 5:
   said releasable means including a lever pivotally carried by said housing and a latching device engaging said lever to hold said pin in a position permitting relative movement between the members to apply said brake means;
   said resilient means driving said lever away from said latching device upon release of the latter.

* * * * *